(12) United States Patent
Sakurai

(10) Patent No.: US 11,145,310 B2
(45) Date of Patent: Oct. 12, 2021

(54) ELECTRONIC DEVICE, VOICE INPUT SENSITIVITY CONTROL METHOD, AND STORAGE MEDIUM STORING VOICE INPUT SENSITIVITY CONTROL PROGRAM

(71) Applicant: CASIO COMPUTER CO., LTD., Tokyo (JP)

(72) Inventor: Toshiya Sakurai, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 101 days.

(21) Appl. No.: 16/363,348

(22) Filed: Mar. 25, 2019

(65) Prior Publication Data

US 2019/0304464 A1  Oct. 3, 2019

(30) Foreign Application Priority Data

Mar. 28, 2018  (JP) .............................. JP2018-062924

(51) Int. Cl.
| | |
|---|---|
| *G10L 15/28* | (2013.01) |
| *G10L 15/22* | (2006.01) |
| *G10L 15/01* | (2013.01) |
| *G06F 1/16* | (2006.01) |
| *H04R 3/00* | (2006.01) |
| *G04B 47/06* | (2006.01) |
| *G04G 21/00* | (2010.01) |

(52) U.S. Cl.
CPC ............ *G10L 15/285* (2013.01); *G04B 47/06* (2013.01); *G04G 21/00* (2013.01); *G06F 1/163* (2013.01); *G10L 15/01* (2013.01); *G10L 15/22* (2013.01); *H04R 3/00* (2013.01)

(58) Field of Classification Search
CPC ....... G10L 15/285; G10L 15/01; G10L 15/22; G04B 47/06; G04G 21/00; H04R 3/00; G06F 1/163
See application file for complete search history.

(56) References Cited

U.S. PATENT DOCUMENTS

| | | | |
|---|---|---|---|
| 8,351,636 B2 | 1/2013 | Ritter et al. | |
| 2007/0160254 A1 | 7/2007 | Ritter et al. | |
| 2010/0173672 A1* | 7/2010 | Kuhl | H04M 1/72563 455/557 |
| 2016/0072327 A1* | 3/2016 | Knutson | G06F 1/1632 320/108 |
| 2016/0259905 A1* | 9/2016 | Park | A61B 5/681 |
| 2017/0052512 A1 | 2/2017 | Mizunuma et al. | |
| 2018/0137861 A1 | 5/2018 | Ogawa | |

FOREIGN PATENT DOCUMENTS

| | | |
|---|---|---|
| JP | 2014063166 A | 4/2014 |
| JP | 2016218852 A | 12/2016 |
| WO | 2015141328 A1 | 9/2015 |

* cited by examiner

*Primary Examiner* — Sonia L Gay
(74) *Attorney, Agent, or Firm* — Holtz, Holtz & Volek PC

(57) ABSTRACT

To provide an electronic device, which is carried by a user and is provided with a voice input unit, provided with a detection unit detecting a proximity state of the electronic device and the user and a control unit controlling the detection sensitivity of a voice input unit according to a detection result by the detection unit. Preferably, the detection unit detects a wearing state of the electronic device by the user and, when a non-wearing state where is detected by the detection unit, the control unit increases the detection sensitivity of the voice input unit to be higher than the detection sensitivity of the voice input unit in the wearing state.

12 Claims, 5 Drawing Sheets

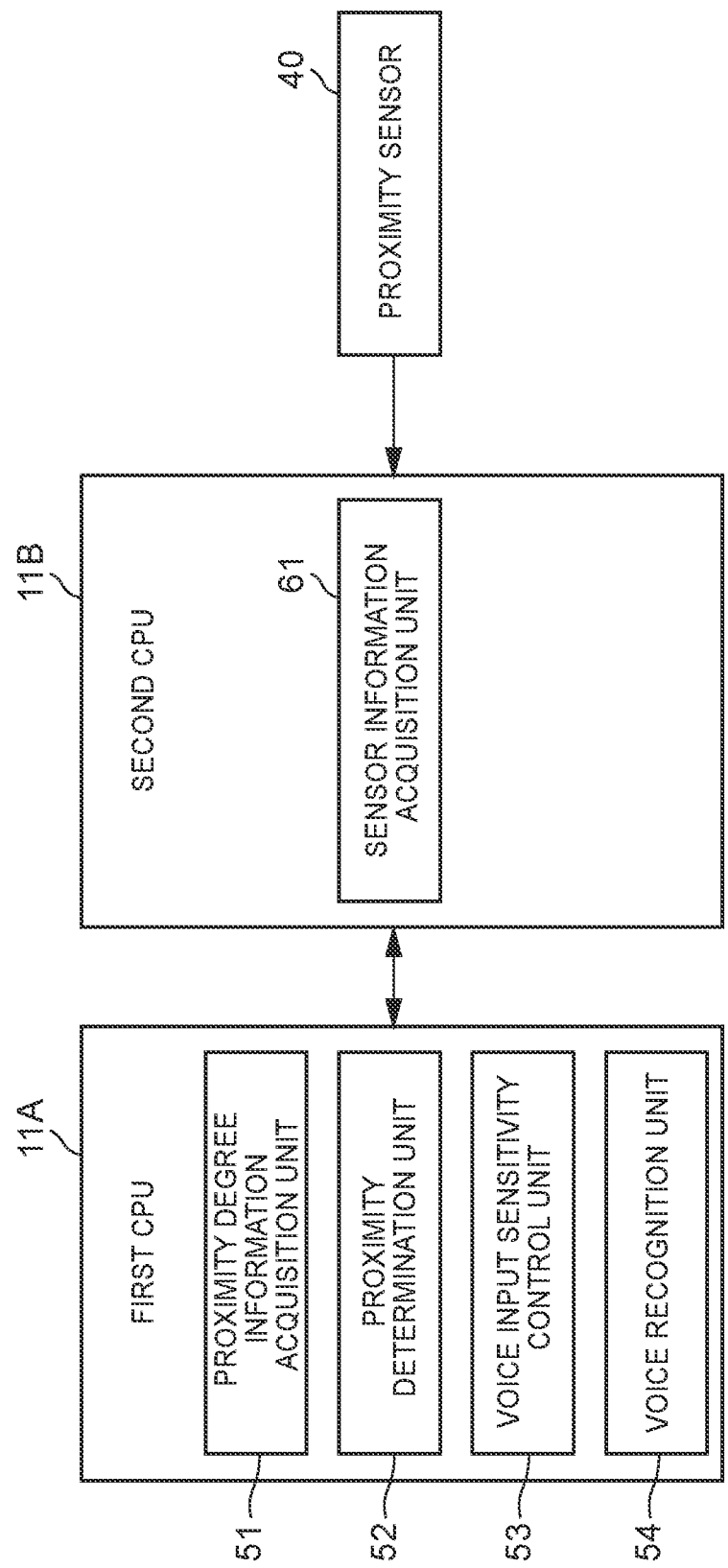

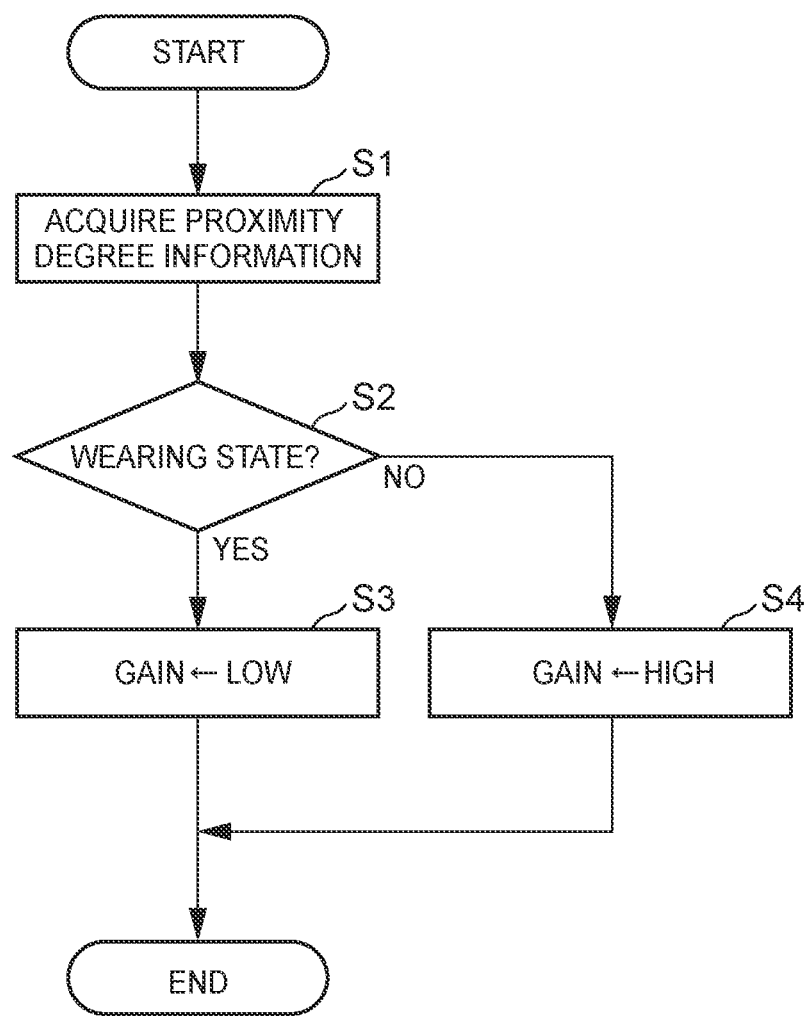

ELECTRONIC DEVICE, VOICE INPUT
SENSITIVITY CONTROL METHOD, AND
STORAGE MEDIUM STORING VOICE
INPUT SENSITIVITY CONTROL PROGRAM

BACKGROUND

1. Field

This embodiment relates to an electronic device, a voice input sensitivity control method, and a storage medium storing a voice input sensitivity control program.

In wearable devices, such as a smartwatch, a technique is known which recognizes a user's voice and performs predetermined operations according to the recognized voice.

SUMMARY

In order to achieve the above-described object, an aspect of this embodiment provides an electronic device, which is carried by a user and is provided with a voice input unit, provided with a detection unit detecting a proximity state and a non-proximity state of the electronic device and the user, and a control unit performing control so that, when the non-proximity state is detected by the detection unit, the detection sensitivity of the voice input unit is higher than the detection sensitivity of the voice input unit in the proximity state.

BRIEF DESCRIPTION OF THE SEVERAL
VIEWS OF THE DRAWING

FIG. 4 is a functional block diagram of the electronic device 1.

FIG. 5 is a flow chart explaining the flow of voice input sensitivity adjustment processing.

DETAILED DESCRIPTION

Hereinafter, each example is described in detail with reference to the accompanying drawings.

Figure 1:
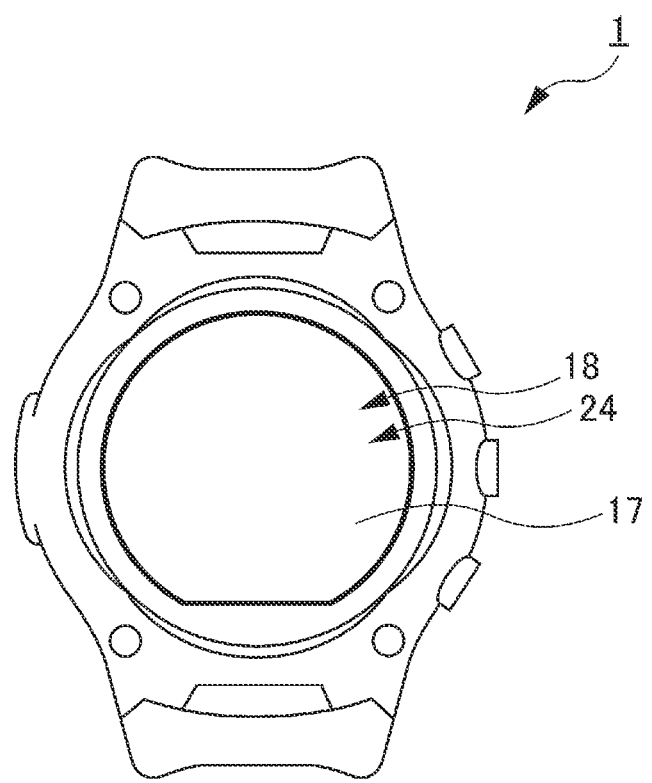
FIG. 1 is a schematic view of an electronic device 1 which is one example of this embodiment.

FIG. 1 is a schematic view of an electronic device 1 of this embodiment.

As illustrated in FIG. 1, the electronic device 1 of this embodiment is illustrated as a wrist watch device (smartwatch or the like).

The electronic device 1 is provided with a first display unit 18 and a second display unit 24 (described later). The second display unit 24 is laminated on the first display unit 18. Furthermore, a touch panel 17 described later is provided on the second display unit 24.

Therefore, the electronic device 1 enables display while superimposing the display of the second display unit 24 on the display of the first display unit 18 and enables a touch operation to display contents.

Figure 2:
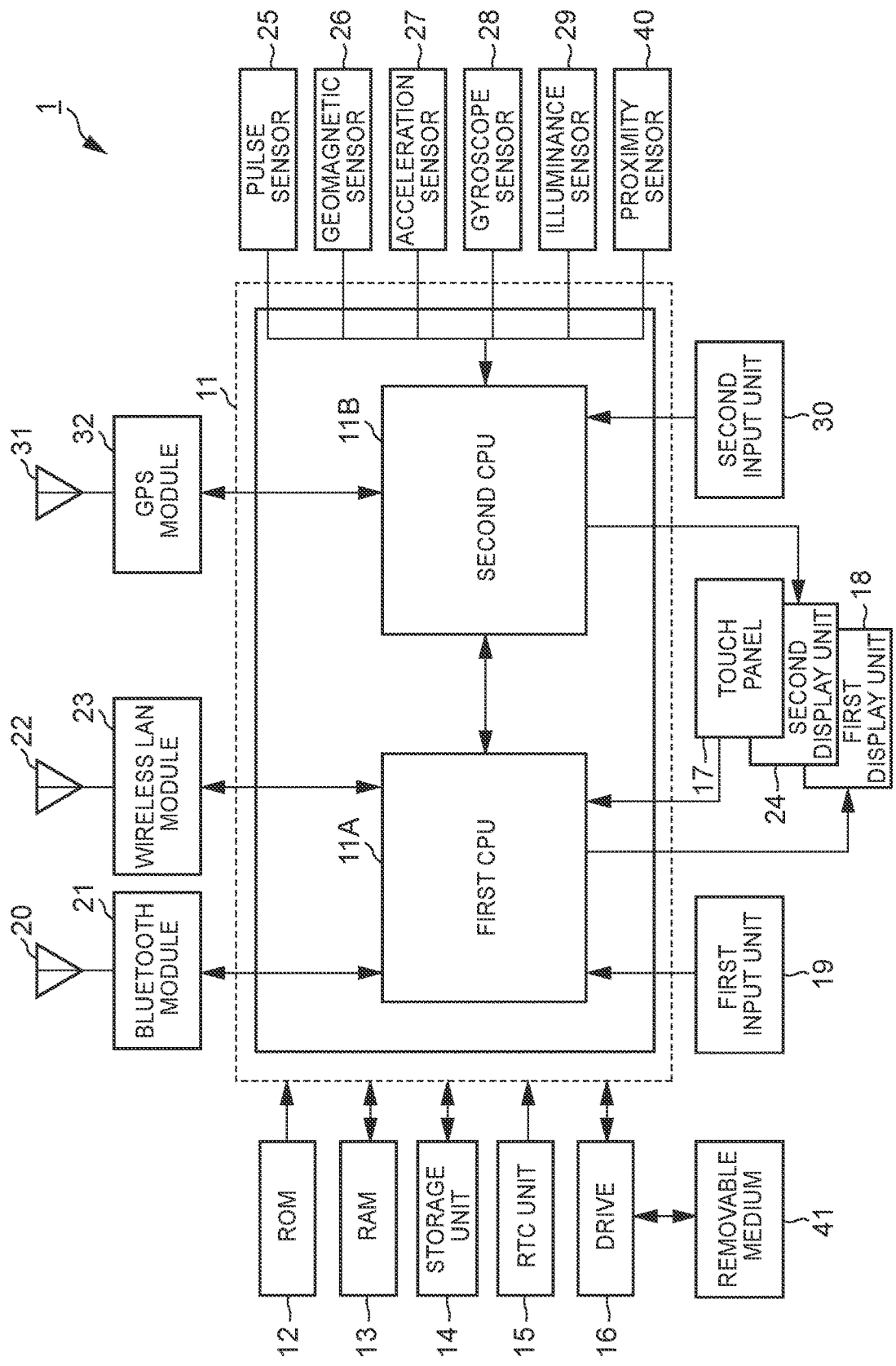
FIG. 2 is a block diagram illustrating the hardware organization of the electronic device 1.

FIG. 2 is a block diagram illustrating the hardware organization of the electronic device 1. As illustrated in FIG. 2, the electronic device 1 is provided with a CPU (Central Processing Unit) 11, a ROM (Read Only Memory) 12, a RAM (Random Access Memory) 13, a storage unit 14, an RTC (Real Time Clock) unit 15, a drive 16, a touch panel 17, a first display unit 18, a first input unit 19, a Bluetooth (Registered Trademark) antenna 20, a Bluetooth module 21, a wireless LAN (Local Area Network) antenna 22, a wireless LAN module 23, a second display unit 24, a pulse sensor 25, a geomagnetic sensor 26, an acceleration sensor 27, a gyroscope sensor 28, an illuminance sensor 29, a second input unit 30, a GPS (Global Positioning System) antenna 31, and a GPS module 32.

The CPU 11 contains a first CPU 11A and a second CPU 11B.

The first CPU 11A performs various kinds of arithmetic processing and executes processing of an OS (Operating System) to thereby control functions similar to those of a smartphone in the electronic device 1.

In this embodiment, the first CPU 11A displays the incoming of an e-mail, messages about weather information, and the like received through the Bluetooth module 21 or the wireless LAN module 23 on the first display unit 18 or receives an operation input through the touch panel 17. The first CPU 11A recognizes voice input through the first input unit 19 and, in addition thereto, performs processing relating to various functions mounted as functions similar to those of a smartphone.

In this embodiment, the first CPU 11A acquires a time signal from the RTC unit 15 at predetermined timing.

The second CPU 11B executes processing of specific programs to thereby instruct display to the second display unit 24, acquire detection results of various sensors, and, in addition thereto, perform processing relating to the various functions mounted as functions of the wrist watch. In this embodiment, the second CPU 11B calculates time based on the time signal input from the first CPU 11A or causes the second display unit 24 to display time, a day of the week, or a date. The processing (calculation of time and the like) of the specific programs executed by the second CPU 11B is a simple action as compared with the processing of the OS executed by the first CPU 11A, and therefore the processing load is low and the processing can be executed with low power consumption. Therefore, the specification of the hardware required for the second CPU 11B may be lower than that required for the first CPU 11A.

The ROM 12 can read data from each of the first CPU 11A and the second CPU 11B and stores various programs executed by the first CPU 11A and the second CPU 11B and initial setting data. For example, the ROM 12 stores programs, such as programs of the OS executed by the first CPU 11A, various programs executed under the management of the OS, or the specific programs (herein, incorporating program for achieving functions of the wrist watch) executed by the second CPU 11B.

The RAM 13 can read and write data from/in each of the first CPU 11A and the second CPU 11B, provides memory space for working to the first CPU 11A and the second CPU 11B, and stores temporary data for working. For example, the RAM 13 provides a system area or a work area when the first CPU 11A executes the OS or provides a storage area when the second CPU 11B executes the specific programs.

The storage unit 14 is a nonvolatile memory capable of reading and wiring data from/in each of the first CPU 11A and the second CPU 11B and is, for example, a flash memory or an EEPROM (Electrically Erasable and Programmable Read Only Memory). The storage unit 14 stores various data (various setting content data and the like) generated in various functions similar to those of a smartphone or functions and the like of the wrist watch.

To the drive 16, a removable medium 41 containing a magnetic disc, an optical disc, a magneto-optical disc, a semiconductor memory, or the like is attached as appropriate. The removable medium 41 can store various data, such as data detected by the various sensors.

The touch panel 17 is an electrostatic capacity type or resistive film type touch panel provided on a display screen of the second display unit 24. The touch panel 17 detects a user's touch operation position and an operation content to an operation surface, generates a signal according to the operation, and then outputs the signal as an input signal to the first CPU 11A.

The first display unit 18 contains an organic EL display (OLED) and displays various kinds of information on a display screen according to the control of the first CPU 11A.

The first input unit 19 outputs a signal indicating an input voice (voice command for operation and the like) to the first CPU 11A. Further details of the first input unit 19 are described later with reference to FIG. 3.

The Bluetooth antenna 20 is an antenna transmitting and receiving an electromagnetic wave based on the standard of the Bluetooth and contains a monopole antenna or the like, for example. The Bluetooth antenna 20 transmits an electric signal of wireless communication input from the Bluetooth module 21 as an electromagnetic wave or converts the received electromagnetic wave to an electric signal, and then outputs the same to the Bluetooth module 21.

The Bluetooth module 21 transmits a signal to the other device through the Bluetooth antenna 20 according to an instruction of the first CPU 11A. The Bluetooth module 21 receives a signal transmitted from the other device and outputs information indicated by the received signal to the first CPU 11A.

The wireless LAN antenna 22 is an antenna capable of receiving a radio wave of a frequency corresponding to wireless communication utilized by the wireless LAN module 23 and contains a loop antenna or a rod antenna, for example. The wireless LAN antenna 22 transmits an electric signal of wireless communication input from the wireless LAN module 23 as an electromagnetic wave or converts the received electromagnetic wave to an electric signal and outputs the same to the wireless LAN module 23.

The wireless LAN module 23 transmits a signal to the other device through the wireless LAN antenna 22 according to an instruction of the first CPU 11A. The wireless LAN module 23 receives a signal transmitted from the other device and outputs information indicated by the received signal to the first CPU 11A.

The second display unit 24 contains a PN (Polymer Network) liquid crystal display capable of partially or entirely transmitting light and displays various kinds of information on a display screen (herein segment display) according to the control of the second CPU 11B.

In this embodiment, the PN liquid crystal display which is the second display unit 24 is laminated on a display screen of the organic EL display which is the first display unit 18 described above, for example.

In the PN liquid crystal display, liquid crystal molecules are irregularly arranged, so that light is reflected in a portion to which no potential is applied. More specifically, in the portion to which no potential is applied, the display by the PN liquid crystal display is performed. On the other hand, a portion to which a potential is applied can transmit light because liquid crystal molecules are aligned perpendicularly to the display screen. More specifically, the portion to which a potential is applied becomes possible to transmit light from the above-described organic EL display, and therefore the display by the organic EL display can be visually recognized through the PN liquid crystal display. More specifically, the display area of the electronic device 1 enables display in a state where the display by the second display unit 24 is superimposed on the display by the first display unit 18.

The pulse sensor 25 is disposed on the rear surface side (side facing a user's arm) of the electronic device 1 and detects the pulse of a user to which the electronic device 1 is attached.

The geomagnetic sensor 26 detects the geomagnetism direction and outputs information indicating the detected geomagnetism direction to the second CPU 11B.

The acceleration sensor 27 detects the acceleration in the triaxial direction in the electronic device 1 and outputs information indicating the detected acceleration to the second CPU 11B.

The gyroscope sensor 28 detects the angular velocity in the triaxial direction in the electronic device 1 and outputs information indicating the detected angular velocity to the second CPU 11B.

The illuminance sensor 29 is disposed in a predetermined place on the rear surface side of the first display unit 18 and detects the brightness (illuminance) in the display area of the electronic device 1 and outputs information indicating the detected brightness to the second CPU 11B.

A proximity sensor 40 is disposed on the rear surface side (side facing a user's arm) of the electronic device 1. The proximity sensor 40 is provided in order to detect whether a user wears the electronic device 1 on the wrist. The proximity sensor 40 outputs a signal according to the distance (proximity degree) from an object to the second CPU 11B.

The second input unit 30 contains various buttons and inputs various kinds of information according to a user's instruction operation.

The GPS antenna 31 receives a radio wave transmitted from the satellite in the GPS and converts the radio wave to an electric signal and outputs the converted electric signal (hereinafter referred to as "GPS signal") to the GPS module 32.

The GPS module 32 detects the position (latitude, longitude, altitude) of the electronic device 1 and the current time indicated by the GPS based on the GPS signal input from the GPS antenna 31. The GPS module 32 outputs information indicating the detected position and current time to the second CPU 11B.

Figure 3:
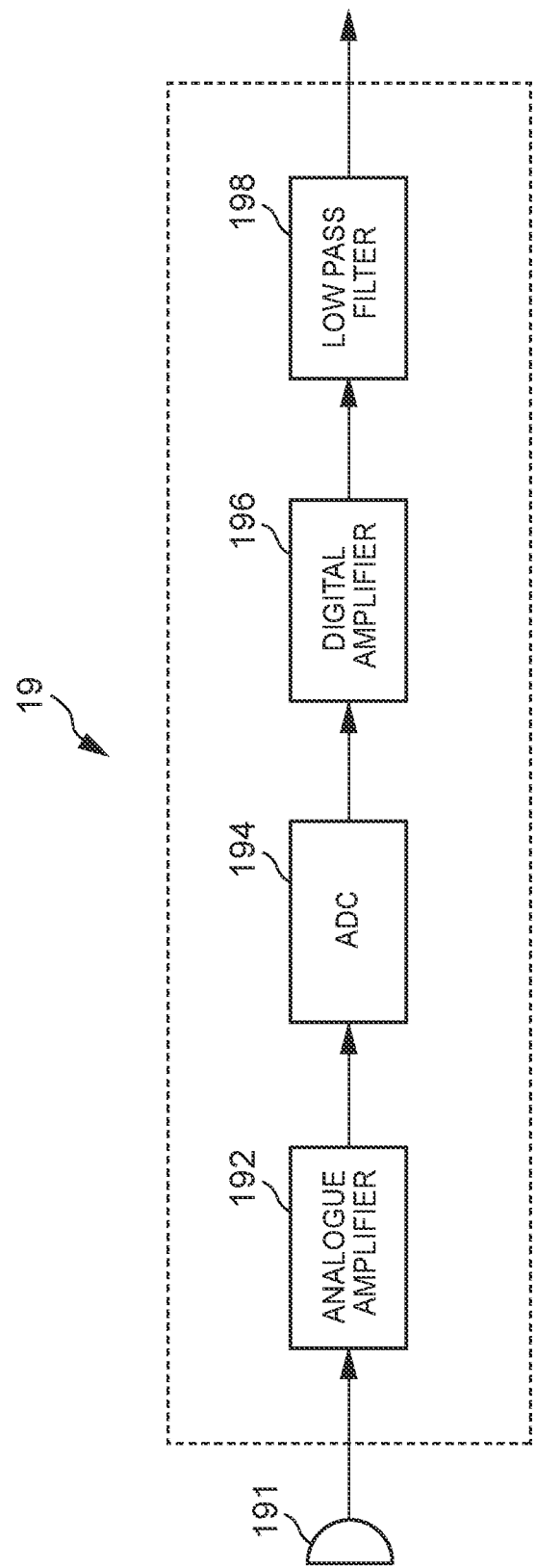
FIG. 3 is a block diagram according to one example of a first input unit.

FIG. 3 is a block diagram according to an example of the first input unit 19. The first input unit 19 contains a microphone 191, an analog amplifier 192, an ADC (Analog to Digital Converter) 194, a digital amplifier 196, and a low pass filter 198.

A voice signal collected by the microphone 191 is amplified by the analog amplifier 192, and then input into the ADC 194. The voice signal input into the ADC 194 is converted to a digital signal, amplified by the digital amplifier 196, and then passed through the low pass filter 198. The voice signal from which a high frequency component is cut by the low pass filter 198 is processed by the first CPU 11A.

Next, the functional configuration of the electronic device 1 is described. FIG. 4 is a functional block diagram illustrating the functional configuration relating to voice input sensitivity adjustment processing among the functional configurations of the electronic device 1 of FIG. 2.

The voice input sensitivity adjustment processing is processing of adjusting the voice input sensitivity according to the proximity state of the electronic device 1 and a user.

When the voice input sensitivity adjustment processing is executed, a proximity degree information acquisition unit 51, a proximity determination unit 52, a voice input sensitivity control unit 53, and a voice recognition unit 54 function in the first CPU 11A and a sensor information acquisition unit 61 functions in the second CPU 11B as illustrated in FIG. 4.

The proximity degree information acquisition unit 51 acquires information (hereinafter referred to as "proximity degree information") indicating the proximity degree detected by the sensor information acquisition unit 61 of the second CPU 11B.

The proximity determination unit 52 determines whether a user wears the electronic device 1 on the wrist based on the proximity degree information. For example, when the proximity degree is equal to or more than a predetermined threshold value (side close to a user), the proximity determination unit 52 determines that a user wears the electronic device 1 on the wrist and, otherwise, determines that a user does not wear the electronic device 1 on the wrist.

The voice input sensitivity control unit 53 controls the voice input sensitivity based on a determination result by the proximity determination unit 52. More specifically, when a user does not wear the electronic device 1 on the wrist, the voice input level by the utterance of a user input into the microphone 191 becomes relatively low, and therefore the voice input sensitivity control unit 53 controls the first input unit 19 so that the voice input sensitivity becomes high in order to prevent a deterioration of the voice recognition accuracy. On the other hand, when a user wears the electronic device 1 on the wrist, the voice input level by the utterance of a user input into the microphone 191 becomes relatively high, and therefore the voice input sensitivity control unit 53 controls the first input unit 19 so that the voice input sensitivity becomes relatively low.

In a modification, the voice input sensitivity control unit 53 may control the voice input sensitivity in three or more steps according to the distance between a user's mouth and the microphone 191. For example, the relationship between the distance and the voice input sensitivity is held as data in a table format or a predetermined function in the electronic device 1. The voice input sensitivity control unit 53 controls the voice input sensitivity referring to the data in a table format or the predetermined function. The distance between a user's mouth and the microphone 191 may be estimated according to the state of a user's hand, for example, when the user wears the electronic device 1 on the wrist. For example, when a user is predicted to be walking because user's hands move forward and backward based on information from the acceleration sensor 27 or the like, the distance between a user's mouth and the microphone 191 may be predicted to be a first distance. On the other hand, when it is determined that a user's hand remains at rest and a user performs a touch operation of a screen based on information from the acceleration sensor 27 or the like, the distance between a user's mouth and the microphone 191 may be predicted to be a second distance shorter than the first distance.

The control of the voice input sensitivity may be achieved by adjusting the gain of the analog amplifier 192, for example. In this case, the voice input sensitivity becomes higher with an increase in the gain of the analog amplifier 192. Alternatively, the control of the voice input sensitivity may be achieved by adjusting the gain of the digital amplifier 196. In this case, the voice input sensitivity becomes higher with an increase in the gain of the digital amplifier 196. Alternatively, the control of the voice input sensitivity may be achieved by adjusting a noise cancellation function by the low pass filter 198. In this case, the voice input sensitivity becomes higher with a reduction in the noise cancellation function by the low pass filter 198. The control of the voice input sensitivity may be achieved by adjusting the gain of the digital amplifier 196 together with the gain of the analog amplifier 192 or by similarly adjusting a plurality of adjustment elements.

When a voice signal is input from the first input unit 19, the voice recognition unit 54 performs voice recognition processing to the input voice signal. The voice recognition unit 54 may be always in a state where a function thereof is turned on so as to be able to detect a predetermined voice trigger (for example, "O.K., XX"). When the voice recognition unit 54 detects the voice trigger, the voice recognition unit 54 recognizes a voice command based on a voice signal which may be input thereafter.

The sensor information acquisition unit 61 acquires detection values detected by various sensors, such as the proximity degree detected by the proximity sensor 40.

FIG. 5 is a flow chart explaining the flow of the voice input sensitivity adjustment processing executed by the electronic device 1 of FIG. 1 having the functional configuration of FIG. 4. The processing illustrated in FIG. 5 is repeatedly executed in each predetermined period.

The voice input sensitivity adjustment processing is started when the power is supplied to the electronic device 1 and ends when an operation of turning off the power supply of the electronic device 1 is performed.

In Step S1, the proximity degree information acquisition unit 51 acquires the proximity degree information acquired by the sensor information acquisition unit 61 of the second CPU 11B.

In Step S2, the proximity determination unit 52 determines whether a user wears the electronic device 1 on the wrist based on the acquired proximity degree information. When it is determined that a user wears the electronic device 1 on the wrist, the process proceeds to Step S3. When it is determined that a user does not wear the electronic device 1 on the wrist, the process proceeds to Step S4.

In Step S3, the voice input sensitivity control unit 53 sets the gain of the analog amplifier 192 to the relatively low first value or maintains the same.

In Step S4, the voice input sensitivity control unit 53 sets the gain of the analog amplifier 192 to the relatively high second value or maintains the same.

By such processing, the voice input sensitivity is adjusted according to whether a user wears the electronic device 1 on the wrist, i.e., according to whether the distance between the user and the device 1 is large, in the electronic device 1. More specifically, when the distance between the user and the device 1 is large, the voice input sensitivity is set to be high. When the distance between the user and the device 1 is not large, the voice input sensitivity is set to be low. As a result, even when the distance between the user and the device 1 is large, good voice recognition accuracy can be maintained. When the distance between the user and the device 1 is not large, the power consumption can be reduced while maintaining good voice recognition accuracy.

By the processing described above, this embodiment has solved a peculiar problem in a technical area of a voice input operation by a conventional wearable device. The peculiar problem is specifically a problem essentially inherent in a conventional technique that a user is expected to always use the conventional wearable device in a wearing state or a state of holding the same, and thus the control of a voice input has been required to be executed corresponding to various user's usage states, e.g., when a wrist wearable device is used in a state of being temporarily removed from the arm and placed on the desk.

This embodiment can solve the peculiar problem that a user's voice is not satisfactorily recognized when the distance between the user and the device is large, e.g., when the user does not wear the device, by the processing described above.

In order to solve the above-described problem, this embodiment has an effect which makes it possible to suppress a reduction in the voice recognition accuracy resulting from a user's usage state.

A series of processing described above can also be executed by hardware or can also be executed by software.

In other words, the functional configuration described above is merely an exemplification and is not particularly limited. More specifically, it is sufficient that the electronic device 1 is provided with a function capable of executing a series of processing described above as a whole. The functional block to be used in order to achieve the function is not particularly limited to the functional configuration described above. One functional block may contain hardware alone, may contain software alone, or may contain a combination thereof.

The functional configuration in this embodiment is achieved by a processor executing arithmetic processing. The processor usable in this embodiment includes those containing various processing devices alone, such as a single processor, a multiprocessor, and a multi-core processor, and, in addition thereto, those containing a combination of the various processing devices and processing circuits, such as an ASIC (Application Specific Integrated Circuit) and an FPGA (Field-Programmable Gate Array). For example, the voice recognition unit 54 may be achieved by a CPU, a Codec IC, a DSP, and the like. The voice recognition unit 54 may be achieved by a DSP built-in microphone and the like together with the first input unit 19.

When causing software to execute a series of processing, a program configuring the software is installed in a computer or the like from a network or a recording medium.

The computer may be a computer built in dedicated hardware. The computer may be a computer capable of executing various functions by installing various programs, e.g., a general-purpose personal computer.

A recording medium containing such a program contains not only the removable medium 41 of FIG. 2 distributed separately from a device body in order to provide a program to a user but a recording medium and the like provided to a user in a state of being built in a device body beforehand. The removable medium 41 contains a magnetic disc (including a floppy disc), an optical disc, a magneto-optical disc, or the like, for example. The optical disc contains a CD-ROM (Compact Disc-Read Only Memory), a DVD (Digital Versatile Disc), a Blu-ray (Registered Trademark) Disc (Blu-ray Disc), and the like, for example. The magneto-optical disc contains an MD (Mini-Disc) and the like. The recording medium provided to a user in a state of being built in a device body beforehand contains the ROM 12 of FIG. 2 where a program is recorded, a semiconductor memory contained in the storage unit 14 of FIG. 2, and the like, for example.

In this specification, a step of describing a program to be recorded in a recording medium includes not only processing to be performed in a time series manner in accordance with the order but processing which is executed in parallel or individually, even though the processing is not always executed in a time series manner.

As described above, embodiments are described in detail but it is not limited to the specific examples and can be variously modified and altered within the scope described in Claims. Moreover, all or some of the constituent components of the embodiments described above can be combined.

For example, although the electronic device 1 is provided with the first display unit 18 and the second display unit 24 in the embodiments described above, the electronic device 1 may be provided with only the first display unit 18 without being limited thereto.

Moreover, although the CPU 11 of the electronic device 1 contains the first CPU 11A and the second CPU 11B in the embodiments described above, the CPU 11 may be one CPU having the function of the first CPU 11A and the function of the second CPU 11B without being limited thereto.

Moreover, the electronic device 1 to which this embodiment is applied is described taking a digital camera wrist watch device (smartwatch and the like) as an example in the embodiments described above but is not particularly limited thereto. For example, this embodiment is applicable to general electronic devices having a voice recognition function. For example, this embodiment is applicable to a notebook personal computer, a printer, a television receiving set, a video camera, a portable navigation device, a cellular phone, a smartphone, a portable game machine, and the like.

Moreover, although the proximity sensor 40 measuring the distance between the electronic device 1 and a user is used in the embodiments described above, the proximity state may be determined without measuring the distance between the electronic device 1 and a user. More specifically, a pressure sensitive sensor or an electrostatic capacity sensor may be used, for example, in place of the proximity sensor 40. Moreover, the pulse sensor 25 may be used in place of the proximity sensor 40. In this case, when the pulse is detected based on sensor information from the pulse sensor 25, the proximity determination unit 52 determines that a user wears the electronic device 1 on the wrist and, otherwise, determines that a user does not wear the electronic device 1 on the wrist. In addition thereto, the wearing state of the electronic device 1 can be determined using a mechanistic configuration. For example, the wearing state of the electronic device 1 can also be determined by detecting the opened/closed state of a band of the watch electronic device 1.

When the wearing position of the electronic device 1 may change, the input sensitivity may be controlled according to the wearing position of the electronic device 1. For example, the wearing position (arm, shoulder, waist, or the like) may be determined based on data output from the gyroscope sensor 28, and then the input sensitivity may be controlled according to the wearing position.

What is claimed is:

1. An electronic device configured to be worn by a user, the electronic device comprising:
   a microphone;
   a sensor; and
   a processor which is configured to:
      detect whether the user is performing an arm motion, based on an output of the sensor; and
      in a case where it is detected that the user is performing the arm motion, control the microphone to set a detection sensitivity of the microphone to be higher than the detection sensitivity of the microphone in a state where the user is not performing the arm motion.

2. The electronic device according to claim 1, further comprising:
   a proximity sensor which acquires information on a proximity of the electronic device to the user;
   wherein the processor is further configured to:

detect one of a wearing state and a non-wearing state of the electronic device by the user based on the information acquired by the proximity sensor, and in a case where the non-wearing state is detected, control the microphone to set the detection sensitivity of the microphone to be higher than the detection sensitivity of the microphone in the wearing state.

3. The electronic device according to claim 2, wherein the processor controls the microphone to increase the detection sensitivity of the microphone in accordance with an increase in a distance between the electronic device and the user.

4. The electronic device according to claim 2, wherein the proximity sensor comprises at least one of a pulse sensor, a pressure sensitive sensor, and an infrared sensor disposed on a rear surface of the electronic device.

5. The electronic device according to claim 2, wherein:
the electronic device is provided with a band for attaching the electronic device to a part of the user's body, and
the proximity sensor comprises a sensor configured to distinguish between an opened state and a closed state of a portion of the band.

6. The electronic device according to claim 2, wherein the electronic device comprises an electronic watch and a wearable terminal attached to a part of the user's body.

7. The electronic device according to claim 1, wherein the arm motion is a motion of an arm of the user on which the electronic device is worn.

8. The electronic device according to claim 7, wherein the sensor comprises an acceleration sensor.

9. A voice input sensitivity control method executed by a computer of an electronic device configured to be worn by a user, the electronic device comprising a microphone and a sensor, and the method comprising:
detecting whether the user is performing an arm motion, based on an output of the sensor; and
when it is detected that the user is performing the arm motion, controlling the microphone to set a detection sensitivity thereof to be higher than a detection sensitivity thereof in a state where the user is not performing the arm motion.

10. The voice input sensitivity control method according to claim 9, wherein the electronic device further comprises a proximity sensor, and the method further comprises:
detecting one of a wearing state and a non-wearing state of the electronic device by the user based on information on a proximity of the electronic device to the user, the information on the proximity being acquired by the proximity sensor; and
performing control so that, when the non-wearing state is detected in the detecting, the detection sensitivity of the microphone is set to be higher than the detection sensitivity of the microphone in the wearing state.

11. A non-transitory storage medium storing a voice input sensitivity control program executable by a computer of an electronic device configured to be worn by a user, the electronic device comprising a microphone and a sensor, and the program being executable to control the computer to execute processing comprising:
detecting whether the user is performing an arm motion, based on an output of the sensor; and
when it is detected that the user is performing the arm motion, controlling the microphone to set a detection sensitivity thereof to be higher than a detection sensitivity thereof in a state where the user is not performing the arm motion.

12. The non-transitory storage medium according to claim 11, wherein the electronic device further comprises a proximity sensor, and the program further controls the computer to execute processing comprising:
detecting one of a wearing state and a non-wearing state of the electronic device by the user based on information on a proximity of the electronic device to the user, the information on the proximity being acquired by the proximity sensor; and
performing control so that, when the non-wearing state is detected in the detecting, the detection sensitivity of the microphone is set to be higher than the detection sensitivity of the microphone in the wearing state.

* * * * *